(12) United States Patent
Hara

(10) Patent No.: US 9,840,294 B2
(45) Date of Patent: Dec. 12, 2017

(54) CONTROLLING BICYCLE COMPONENT ACCORDING TO SEAT POSITION

(71) Applicant: Shimano Inc., Sakai-shi, Osaka (JP)

(72) Inventor: Nobukatsu Hara, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 131 days.

(21) Appl. No.: 14/671,888

(22) Filed: Mar. 27, 2015

(65) Prior Publication Data

US 2016/0280299 A1 Sep. 29, 2016

(51) Int. Cl.
*B60R 22/00* (2006.01)
*B62J 1/28* (2006.01)
*B62J 1/10* (2006.01)
*B62K 19/36* (2006.01)

(52) U.S. Cl.
CPC . *B62J 1/28* (2013.01); *B62J 1/10* (2013.01); *B62K 19/36* (2013.01); *B62K 2207/00* (2013.01)

(58) Field of Classification Search
CPC .................................... B62J 1/28; B62J 1/10
See application file for complete search history.

(56) References Cited

U.S. PATENT DOCUMENTS

| | | | |
|---|---|---|---|
| 6,281,674 B1 * | 8/2001 | Huang | B62J 11/00 324/174 |
| 8,091,910 B2 | 1/2012 | Hara et al. | |
| 2004/0263330 A1 * | 12/2004 | Alarcon | G08G 1/161 340/539.23 |
| 2015/0197308 A1 * | 7/2015 | Butora | B62K 25/10 280/283 |

* cited by examiner

*Primary Examiner* — Adam Alharbi
(74) *Attorney, Agent, or Firm* — Alleman Hall Creasman & Tuttle LLP

(57) ABSTRACT

A control device for controlling a bicycle component in accordance with a seat position of a bicycle seat is provided. The control device may comprise a transmitter configured to transmit a signal relating to the seat position of the bicycle seat, and a mounting structure configured to detachably mount the transmitter to at least one of a bicycle seat post, a bicycle frame, and the bicycle seat.

16 Claims, 8 Drawing Sheets

CONTROLLING BICYCLE COMPONENT ACCORDING TO SEAT POSITION

BACKGROUND

Bicycling is becoming an increasingly popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle seat post.

It is beneficial to be able to control a bicycle suspension in accordance with a height of the bicycle seat post. For example, it is preferable for a rider to lock a telescopic operation of the bicycle suspension when the height of the bicycle seat post is highest, such as during a hill climb. In contrast, it is also preferable for the rider to allow the telescopic operation of the bicycle suspension when the height of the bicycle seat post is lowest, such as when traveling downhill. To conveniently adjust the height of the bicycle seat post, a height adjustment structure, such as a hydraulic structure, is typically provided within the seat post. To accurately control the seat post height, a device for detecting a current seat post height may be utilized. However, placing a device for detecting the height of the bicycle seat post within the bicycle seat post itself can be difficult. Such placement is particularly challenging when the height adjustment structure is disposed within the bicycle seat post.

SUMMARY

To address the above issues, a control device for controlling a bicycle component in accordance with a seat position of a bicycle seat is provided. According to one aspect of the invention, the control device may comprise a transmitter configured to transmit a signal relating to the seat position of the bicycle seat, and a mounting structure configured to detachably mount the transmitter to at least one of a bicycle seat post, a bicycle frame, and the bicycle seat. One potential advantage of this configuration is that the control device can be securely mounted to various styles of bicycle parts.

In this aspect, the control device may further comprise an operated member configured to cause the transmitter to transmit the signal when operated, and an operating member configured to operate the operated member when the seat position is at a predetermined position. One potential advantage of this configuration is that the signal is transmitted when the separate members are aligned, which occurs when the seat position is at a predetermined position.

In this aspect, the operating member may be configured to be movable with respect to the operated member in accordance with a telescopic movement of the bicycle seat post. One potential advantage of this configuration is that the operating member and the operated member may move relative to one another such that the signal is transmitted in accordance with the telescopic movement of the bicycle seat post.

In this aspect, a relative position of the operated member and the operating member may be adjustable so that the predetermined position is adjustable. One potential advantage of this configuration is that the predetermined position may be set differently to correspond to individual riders of the bicycle.

In this aspect, a position of the operated member may be adjustable with respect to the transmitter in a direction of the telescopic movement of the bicycle seat post. One potential advantage of this configuration is that the predetermined position may be set differently according to individual riders of the bicycle.

In this aspect, the control device may further comprise a plurality of the operated members disposed at respective positions that are different from each other along a direction of the telescopic movement of the bicycle seat post. One potential advantage of this configuration is that multiple predetermined positions may be set such that the bicycle component may be controlled differently at each predetermined position.

In this aspect, at least one of the plurality of operated members may be configured to be detachably attached to the control device. One potential advantage of this configuration is that a number and respective position of the operated members may be easily adjustable.

In this aspect, the operated member may be a switch configured to be contacted by the operating member to cause the transmitter to transmit the signal. One potential advantage of this configuration is that, since the signal is transmitted when the operating member contacts the switch and is not transmitted when the operating member does not contact the switch, the bicycle component can be controlled more particularly in accordance with the seat position.

In this aspect, the operating member may be a rod extending along a direction of the telescopic movement of the bicycle seat post. One potential advantage of this configuration is that the rod may slide smoothly along the direction of the telescopic movement.

In this aspect, the control device may further comprise an adjusting structure configured to adjust a relative position of the operated member and the operating member in a circumferential direction around the bicycle seat post. One potential advantage of this configuration is that the operating member can smoothly slide inside the transmitter in accordance with a telescopic movement of the bicycle seat post.

In this aspect, the operated member may be a sensor configured to detect the seat position of the bicycle seat, and the transmitter may include a controller configured to control the transmitter such that the transmitter transmits the signal in response to a seat position signal detected by the sensor. One potential advantage of this configuration is that the bicycle component can be controlled more particularly in response to a change in the seat position.

In this aspect, the mounting structure may include a first mounting part configured to be mounted to one of the bicycle frame and a first cylinder of the bicycle seat post, and a second mounting part configured to be mounted to one of the bicycle seat and a second cylinder of the bicycle seat post. The second cylinder may be configured to be attached to the bicycle seat. One potential advantage of this configuration is that each mounting part may firmly attach the control device to a different part of the bicycle such that relative movement between the operating member and operated member more closely corresponds to the telescopic movement of the seat post.

In this aspect, the first mounting part may comprise a first clamping member configured to be detachably clamped to the one of the bicycle frame and the first cylinder of the bicycle seat post. One potential advantage of this configuration is that the control device may be firmly mounted to the bicycle while still being removable, and further, the control device may be mounted to various types of bicycles of various configurations with the same clamping member.

In this aspect, the second mounting part may comprise a second clamping member configured to be detachably clamped to the one of the bicycle seat and the second cylinder of the bicycle seat post. One potential advantage of this configuration is that the transmitter may be firmly mounted to the bicycle while still being removable, and further, the transmitter may be mounted to various types of bicycles of various configurations with the same clamping member.

According to another aspect, a method of controlling a bicycle component in accordance with a seat position of a bicycle seat is provided. The method may comprise detachably mounting a transmitter to at least one of a bicycle seat post, a bicycle frame, and the bicycle seat, and transmitting, via the transmitter, a signal relating to the seat position of the bicycle seat. One potential advantage of this configuration is that the control device can be securely mounted to various styles of bicycle parts.

In this aspect, the method may further comprise operating an operated member with an operating member when the seat position is at a predetermined position. The operated member may be configured to transmit the signal via the transmitter when operated. One potential advantage of this configuration is that the signal is transmitted when the separate members are aligned, which occurs when the seat position is at a predetermined position.

In this aspect, the operating member may be configured to be movable with respect to the operated member in accordance with a telescopic movement of the bicycle seat post. One potential advantage of this configuration is that the operating member and the operated member may move relative to one another such that the signal is transmitted in accordance with the telescopic movement of the bicycle seat post.

In this aspect, a plurality of the operated members may be disposed at respective positions that are different from each other along a direction of the telescopic movement of the bicycle seat post. One potential advantage of this configuration is that multiple predetermined positions may be set such that the bicycle component may be controlled differently at each predetermined position.

In this aspect, the operated member may be a switch, and the method may further comprise contacting the switch by the operating member to transmit the signal. One potential advantage of this configuration is that since the signal is transmitted when the operating member contacts the switch and is not transmitted when the operating member does not contact the switch, the bicycle component can be controlled more particularly in accordance with the seat position.

In this aspect, the operating member may be a rod extending along a direction of the telescopic movement of the bicycle seat post. One potential advantage of this configuration is that the rod may slide smoothly along the direction of the telescopic movement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

A selected embodiment of the present invention will now be described with reference to the accompanying drawings. It will be apparent to those skilled in the art from this disclosure that the following description of an embodiment of the invention is provided for illustration only and not for the purpose of limiting the invention as defined by the appended claims and their equivalents.

Figure 1:
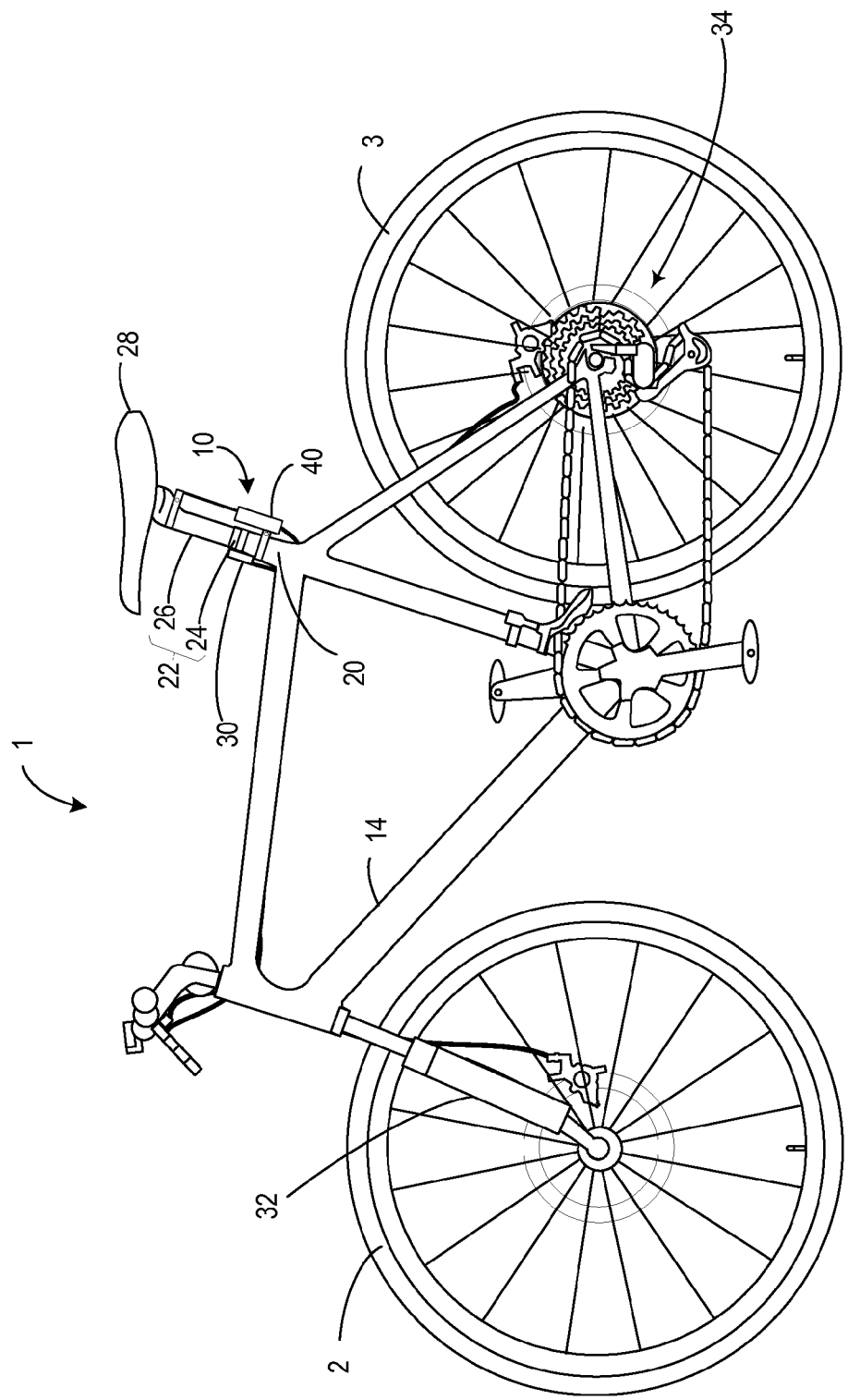
FIG. 1 illustrates an exemplary bicycle equipped with a control device.

Referring initially to FIG. 1, an exemplary bicycle 1 equipped with a control device 10 according to one disclosed embodiment of the present invention is shown. The bicycle 1 may include a bicycle frame 14 attached to a front wheel 2 and a rear wheel 3. The bicycle frame 14 may include a bicycle seat tube 20 to which a bicycle seat post 22 is attached. The bicycle seat post 22 may comprise a lower cylinder 24 (first cylinder) and an upper cylinder 26 (second cylinder), and a seat position of a bicycle seat 28 may be adjusted via a height adjustment structure 30, which may be, for example, a hydraulic structure. When the seat position is adjusted, the upper cylinder 26 may slide within the lower cylinder 24 in a telescopic movement to shorten or lengthen the seat post 22.

The bicycle 1 may further include a suspension 32, illustrated here as a front telescopic fork, although the suspension 32 may be any type and may be located at other positions on the bicycle 1 without departing from the scope of the present disclosure. For example, the suspension 32 may be a rear suspension. The bicycle 1 may also include a transmission 34, which may be a rear derailleur as illustrated, a front derailleur, or an internal gear transmission, for example.

Figure 2:
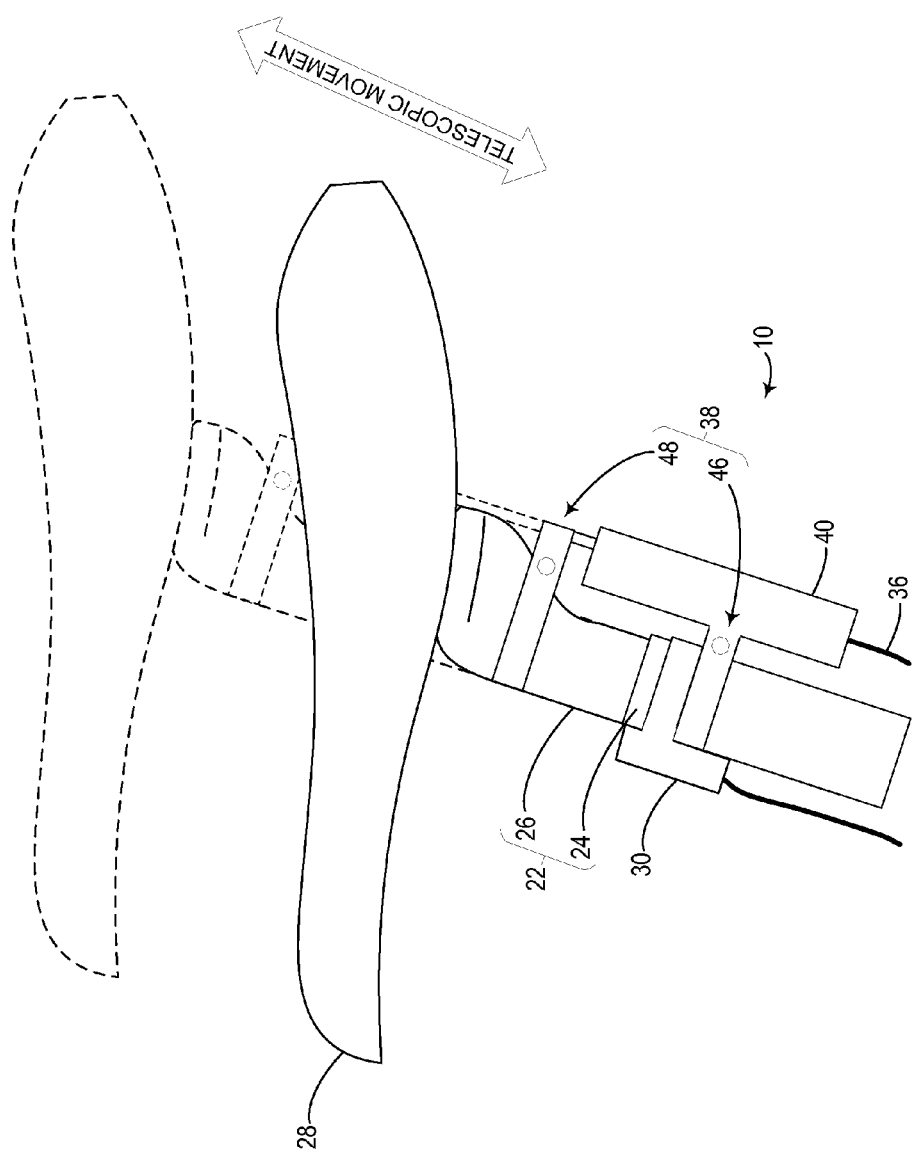
FIG. 2 illustrates a seat of the bicycle adjusted to various seat positions.

FIG. 2 illustrates the bicycle seat 28 of the bicycle 1 adjusted to various seat positions. The arrow depicted in FIG. 2 demonstrates the telescopic movement of the bicycle seat post 22 as the seat position is adjusted. The control device 10 may be provided for controlling a bicycle component in accordance with the seat position of the bicycle seat 28. The controlled bicycle component may be, for example, the suspension 32 and/or the transmission 34. The control device 10 may be electrically connected to the controlled bicycle component by a cable 36, or alternatively, may be in wireless communication with the controlled bicycle component. The control device 10 may comprise a transmitter 40 configured to transmit a signal relating to the seat position of the bicycle seat 28, and a mounting structure 38 configured to detachably mount the transmitter 40 to at least one of the bicycle seat post 22, the bicycle frame 14, and the bicycle seat 28. The transmitter 40 may be detachably mounted to the bicycle seat post 22, for example, as shown in FIG. 1. Thus, the transmitter 40 may be detachably mounted to the bicycle seat tube 20 of the bicycle frame 14 by being detachably mounted to the bicycle seat post 22.

Figure 3:
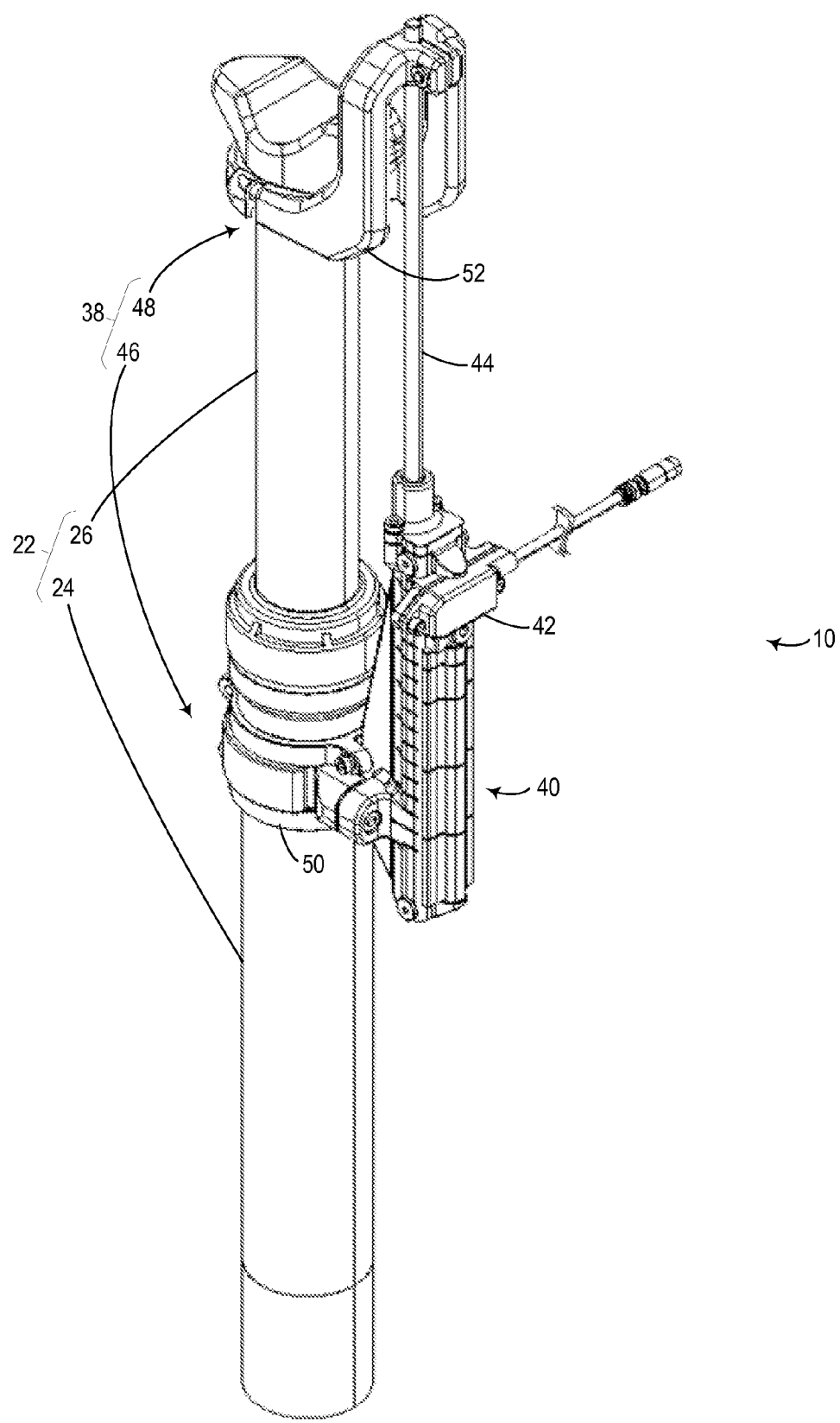
FIG. 3 illustrates a detailed schematic of the control device detachably mounted to the bicycle.

FIG. 3 illustrates a detailed schematic of the control device 10 detachably mounted to the bicycle 1. Here, the transmitter 40 is shown as being detachably mounted to the bicycle seat post 22, specifically to the lower cylinder 24. The control device 10 may further comprise an operated member 42 configured to cause the transmitter 40 to transmit the signal when operated, and an operating member 44 configured to operate the operated member 42 when the seat position is at a predetermined position. The transmitter 40 may include a power source such as a battery (not shown). The operating member 44 may be configured to be movable with respect to the operated member 42 in accordance with the telescopic movement of the bicycle seat post 22. For instance, during the telescopic movement shown in FIG. 2, the operating member 44 may move with the upper cylinder 26 and/or bicycle seat 28, whereas the operated member 42 may remain stationary with the lower cylinder 24 and/or bicycle seat tube 20.

The mounting structure 38 may include a first mounting part 46 configured to be mounted to one of the bicycle frame 14 and the first cylinder (lower cylinder) 24 of the bicycle seat post 22, and a second mounting part 48 configured to be mounted to one of the bicycle seat 28 and the second cylinder (upper cylinder) 26 of the bicycle seat post 22. The second cylinder 26 may be configured to be attached to the bicycle seat 28 as in FIG. 2. The first mounting part 46 may comprise a first clamping member 50 configured to be detachably clamped to the one of the bicycle frame 14 and the first cylinder 24 of the bicycle seat post 22. The second mounting part 48 may comprise a second clamping member 52 configured to be detachably clamped to the one of the bicycle seat 28 and the second cylinder 26 of the bicycle seat post 22. Thus, each mounting part 46 and 48 may be securely and detachably clamped to different parts of the bicycle 1, and in this manner, the operating member 44 and operated member 42 may move relative to one another in accordance with a relative movement of the bicycle seat 28 to the bicycle 1. In the illustrated embodiment, the operated member 42 is detachably mounted to the first cylinder 24 by the first mounting part 46, and the operating member 44 is detachably mounted to the second cylinder 26 by the second mounting part 48.

Figure 4:
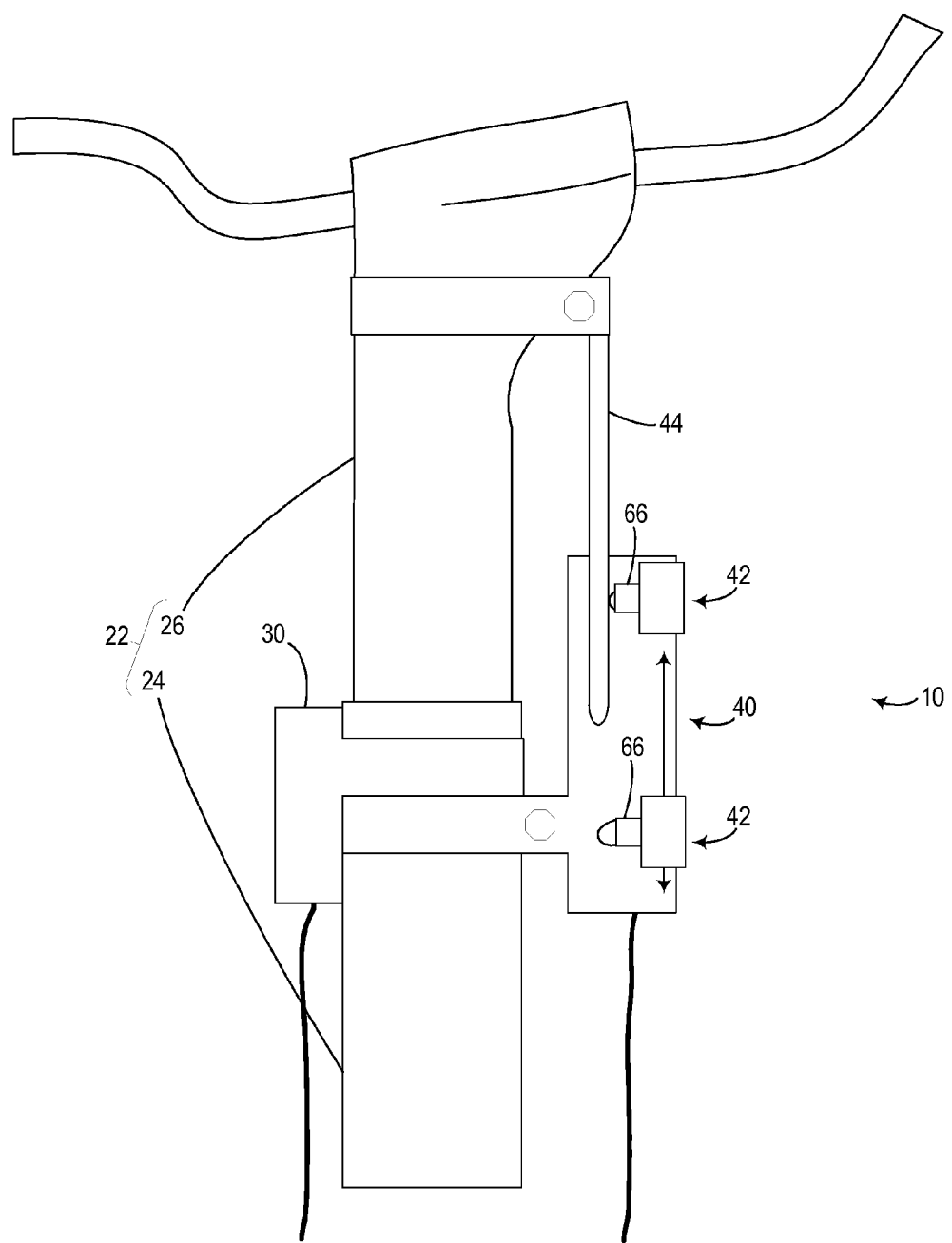
FIG. 4 illustrates a simplified cross-sectional view of a transmitter of the control device according to one disclosed embodiment of the present invention.

FIG. 4 illustrates a simplified cross-sectional view of the transmitter 40 according to one disclosed embodiment of the present invention. A relative position of the operated member 42 and the operating member 44 may be adjustable so that the predetermined position of the seat 28 is adjustable. This may be accomplished by, for example, adjusting the position of the operated member 42 as shown by the arrow in FIG. 4. In this manner, a position of the operated member 42 may be adjustable with respect to the transmitter 40 in a direction of the telescopic movement of the bicycle seat post 22. Instead of or in combination with this, the relative position may be adjusted by adjusting a position of the operating member 44 relative to the one of the second cylinder 26 and the bicycle seat 28 and/or by adjusting a position of the transmitter 40 relative to the one of the first cylinder 24 and bicycle seat post 22. Allowing the predetermined position of the bicycle seat 28 to be adjustable may allow riders of different heights or fitness levels to control the bicycle component at a preferred predetermined position. Furthermore, regardless of the type or size of the bicycle 1, the control device 10 may be installed on the bicycle 1 and the predetermined position may be calibrated.

The control device 10 may further comprise a plurality of operated members 42 disposed at respective positions that are different from each other along a direction of the telescopic movement of the bicycle seat post 22. In FIG. 4, two operated members 42 are shown, although the number is not particularly limited and may instead be, for example, one, three or more. However, the plurality of operated members 42 may allow for increased accuracy and sensitivity to the seat position, and even for multiple predetermined positions. When the plurality of operated members 42 are provided, at least one of the plurality of operated members 42 may be configured to be detachably attached to the control device 10 such that the number and respective positions of the operated members 42 may be easily adjustable. However, it is possible that the plurality of operated members 42 are configured to be non-detachably attached to the control device 10. Further, when the plurality of operated members 42 are provided, one of the plurality of operated members 42 may transmit a different signal from the signal transmitted by the operation of another of the plurality of the operated members 42. Thus, the bicycle component may be operated differently in accordance with each signal respectively transmitted by the operation of the plurality of the operated members 42. Thus, the bicycle component may automatically change its state in accordance with a plurality of positions of the bicycle seat 28.

As shown in FIG. 4, the operated member 42 may be or include a switch 66 configured to be contacted by the operating member 44 to cause the transmitter 40 to transmit the signal. The signal, for example, may include a command to operate the bicycle component, such as the suspension 32. The bicycle component may change its state in response to the signal, for instance, by extending or shortening. The operating member 44 may be a rod extending along a direction of the telescopic movement of the bicycle seat post 22. In this case, and with reference also to FIG. 2, as the seat position is adjusted, the operating member 44 may move in accordance with the telescopic movement of the bicycle seat post 22 while the operated member 42 remains stationary with respect to the bicycle frame 14. Returning to FIG. 4, as the operating member 44 moves relative to the switches 66, a tip of the operating member may depress the switches 66 to actuate them, one at a time. If no switch 66 is depressed, then the operating member 44 (and thus the bicycle seat 28) is at a high position. If an upper switch 66 is depressed, as shown in FIG. 4, then the operating member 44 is at a first drop. If both switches 66 are depressed, then the operating member 44 is at a second drop lower than the first drop.

Figure 5:
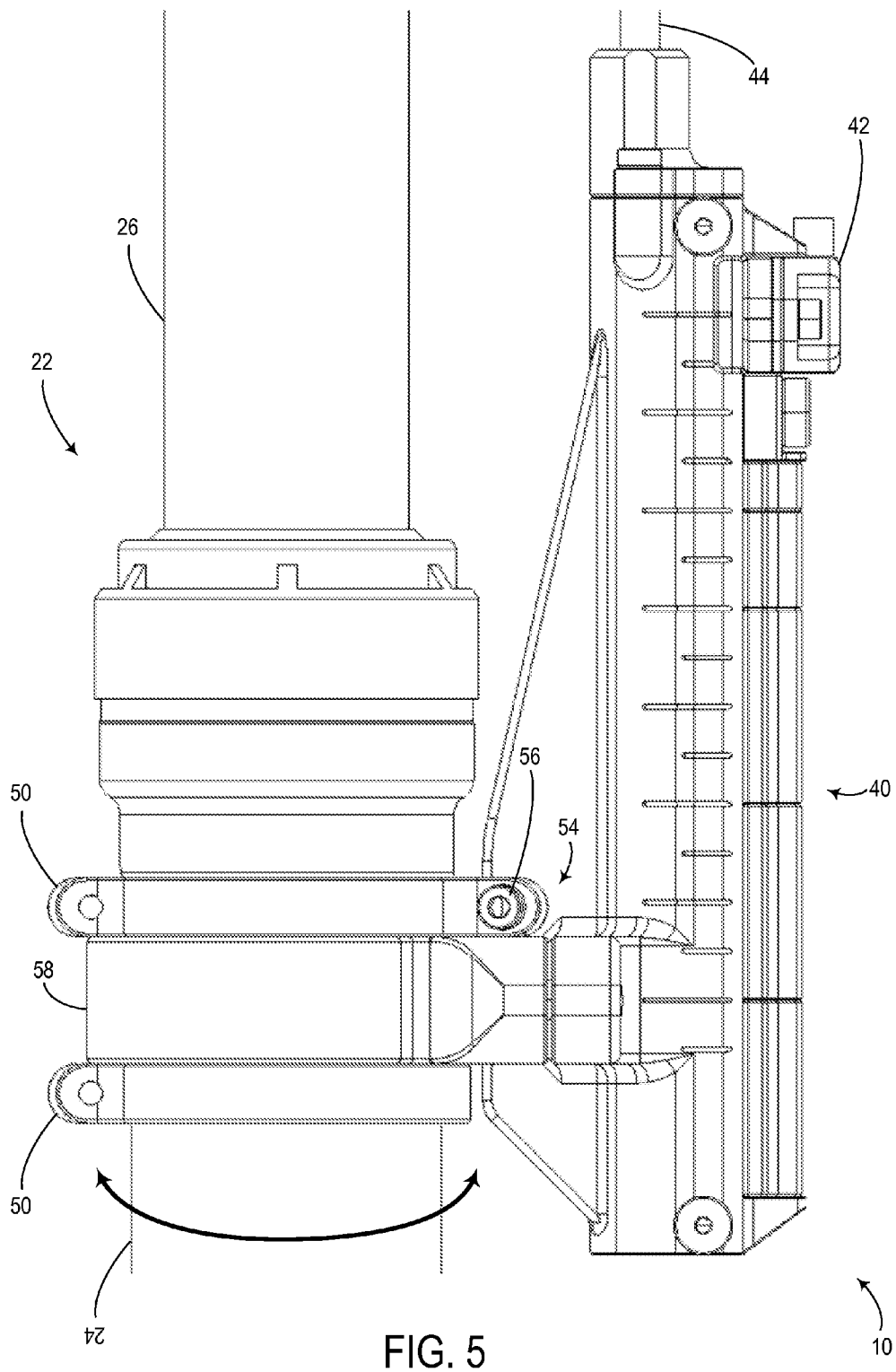
FIG. 5 illustrates a detailed schematic of a side view of the transmitter and an adjusting structure.

The control device 10 may further comprise an adjusting structure 54. FIG. 5 illustrates a detailed schematic of a side view of the transmitter 40 and the adjusting structure 54. The adjusting structure 54 may comprise two bolts 56 and a band 58. The band 58 may be disposed around at least a portion of the mounting structure 38 (e.g. the first clamping member 50), joined to the transmitter 40, and free to rotate circumferentially about the seat post 22 when not fixed to a stationary part. However, the transmitter 40, joined to the band 58, may be circumferentially positioned to the mounting structure 38 by the two bolts 56, for example. More specifically, the transmitter 40 may be disposed between the two bolts 56 in a circumferential direction of the seat post 22 and abut them to be restricted from moving in the circumferential direction. It will be appreciated that in FIG. 6, one bolt 56 is depicted on a visible side of the transmitter 40 while a corresponding bolt is hidden from view on the opposite side of the transmitter 40. The adjusting structure 54 may be configured to adjust a relative position of the operated member 42 and the operating member 44 in a circumferential direction around the bicycle seat post 22, as shown by the thick arrow in FIG. 5. The relative position may be adjusted by tightening or loosening the two bolts 56, for example. The adjusting structure 54 may allow circumferential movement of the transmitter 40 around the bicycle seat post 22 when the bolts 56 are loosened and not allow the circumferential movement when the bolts 56 are tightened, for example. In this manner, the operating member 44 can smoothly slide inside the transmitter 40 in accordance with the telescopic movement of the bicycle seat post 22.

Figure 6:
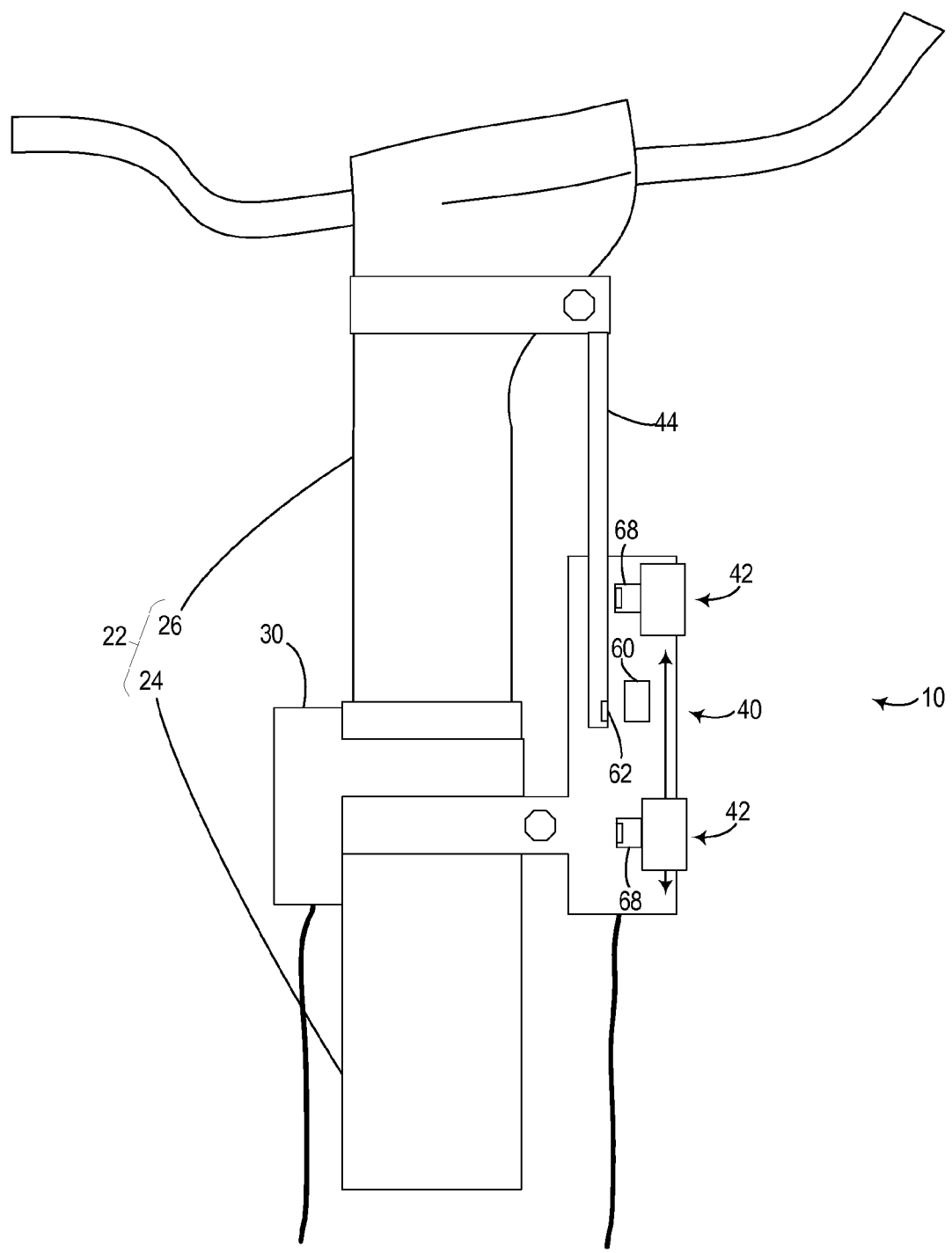
FIG. 6 illustrates a cross-sectional view of the control device according to another disclosed embodiment of the present invention.

FIG. 6 illustrates a cross-sectional view of the control device according to another disclosed embodiment of the present invention. Instead of the switches 66, the operated member 42 may be or include a sensor 68 configured to detect the seat position of the bicycle seat 28, and the transmitter 40 may include a controller 60 configured to control the transmitter 40 such that the transmitter 40 transmits the signal in response to a seat position signal detected by the sensor 68. The controller 60 may include, for example, a processor and memory holding instructions executable by the processor to control the transmitter 40. As one example, the sensor 68 may be a hole sensor and the operating member 44 may include a magnet 62 to operate the sensor 68. If the plurality of operated members 42 are installed as shown, the plurality of operated members 42 may be a plurality of sensors 68, and each sensor 68 may be connected to the controller 60.

Figure 7:
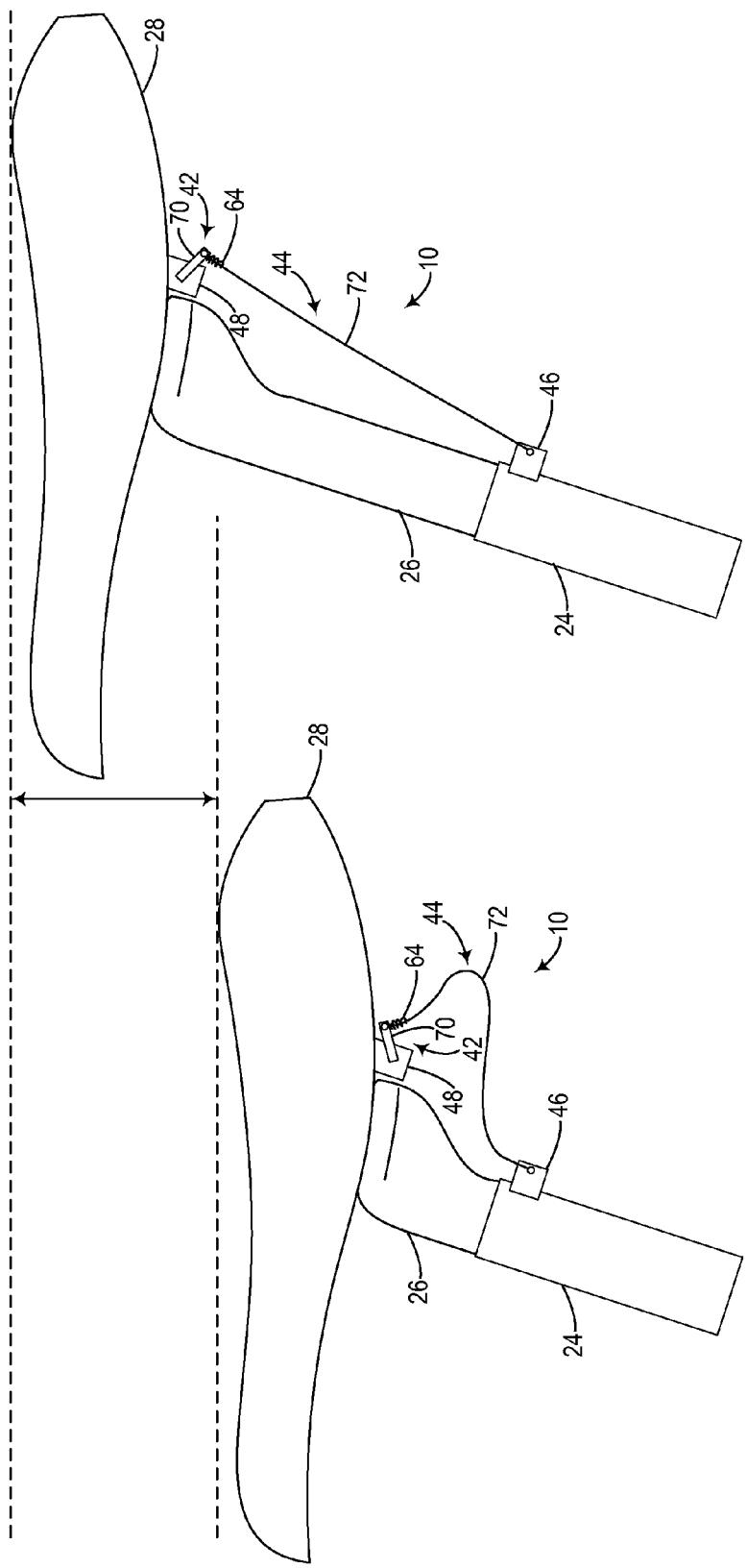
FIG. 7 illustrates the control device according to another disclosed embodiment of the present invention.

FIG. 7 illustrates the control device 10 according to another disclosed embodiment of the present invention. In this embodiment, the operated member 42 is a toggle switch 70 and the operating member 44 is a line 72. The control device 10 shown as being mounted to the lower cylinder 24 and the bicycle seat 28 as one example, but as described above, it may instead be mounted to the bicycle frame 14 and/or upper cylinder 26. As the seat position is adjusted as shown by the arrow between two dashed lines, the line 72 may transition from slack (shown on left) to taut (shown on right). When the line 72 is slack, the toggle switch 70 may be in a first position, and when the line 72 is drawn taut, the toggle switch 70 may be pulled by the line 72 to a second position. The first position may be an off position in which the signal is not transmitted and the second position may be an on position in which the signal is transmitted, or vice versa. The control device 10 may include a biasing element 64 to absorb tension in the line 72.

Figure 8:
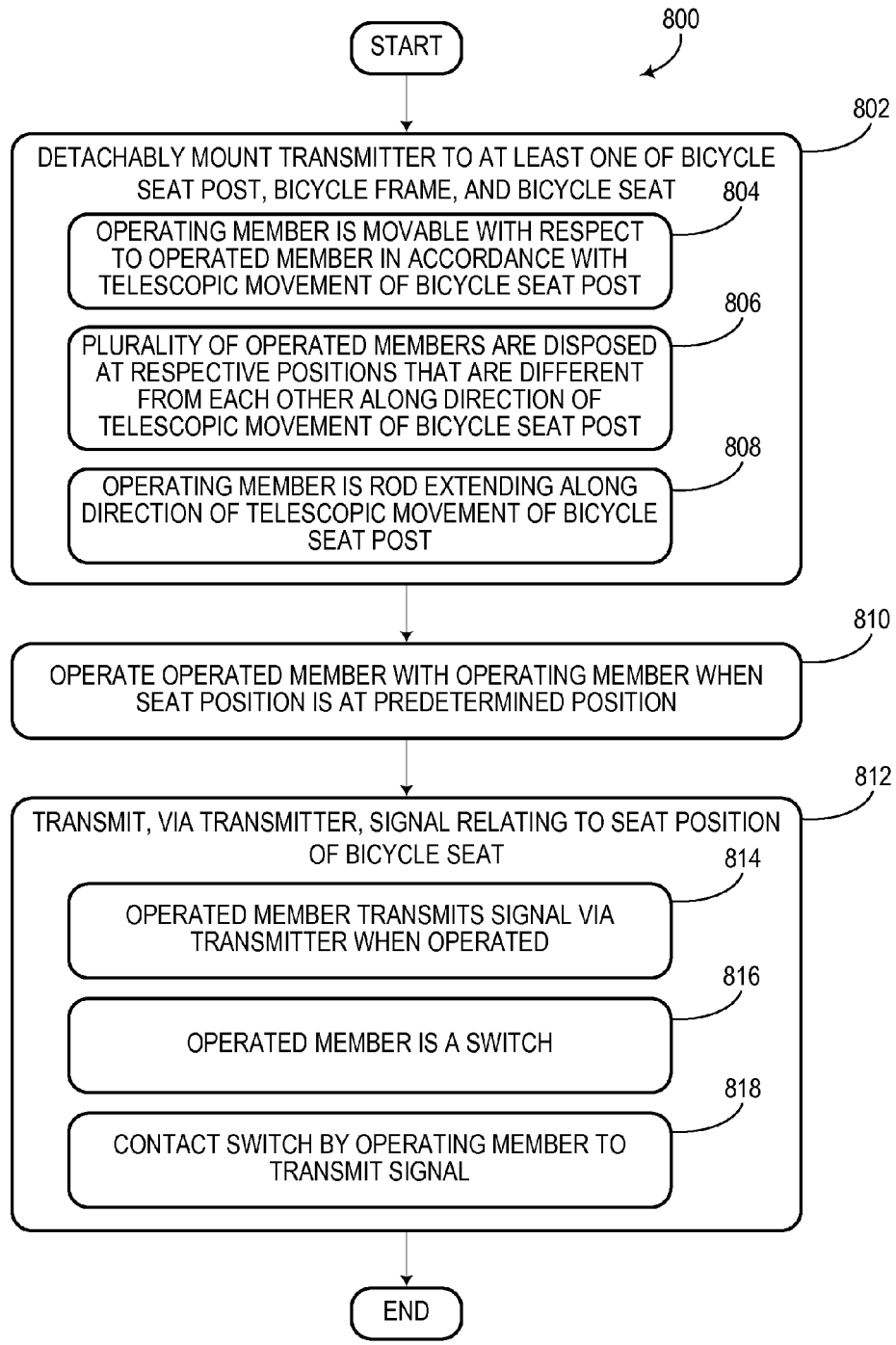
FIG. 8 illustrates a flowchart of a method of controlling a bicycle component in accordance with a seat position of the bicycle seat.

FIG. 8 illustrates a flowchart of a method 800 of controlling a bicycle component in accordance with a seat position of a bicycle seat. The following description of method 800 is provided with reference to the various components of the bicycle 1 and the control device 10 described above and shown in FIGS. 1-7. It will be appreciated that method 800 may also be performed in other contexts using other suitable components.

With reference to FIG. 8, at 802, the method 800 may include detachably mounting a transmitter to at least one of a bicycle seat post, a bicycle frame, and the bicycle seat. At 804, an operating member may be configured to be movable with respect to an operated member in accordance with a telescopic movement of the bicycle seat post. At 806, a plurality of the operated members may be disposed at respective positions that are different from each other along a direction of the telescopic movement of the bicycle seat post. At 808, the operating member may be a rod extending along a direction of the telescopic movement of the bicycle seat post.

At 810, the method may include operating the operated member with the operating member when the seat position is at a predetermined position. At 812, the method may include transmitting, via the transmitter, a signal relating to the seat position of the bicycle seat. At 814, the method may include the operated member being configured to transmit the signal via the transmitter when operated. At 816, the operated member may be a switch, and at 818, the method may include contacting the switch by the operating member to transmit the signal.

A control device for controlling a bicycle component in accordance with a seat position of a bicycle seat has been described. Such a control device may be able to control a bicycle suspension or transmission in accordance with a height of the bicycle seat post, providing a different riding experience during a hill climb than when travelling downhill, for example. As placing a device for detecting the height of the bicycle seat post within the bicycle seat post itself may be difficult due to the presence of a height adjustment structure (e.g. hydraulic structure within the bicycle seat post), the control device may be mounted to at least one of the bicycle seat post, a bicycle frame, and the bicycle seat. One potential advantage of this configuration is that the control device can be securely mounted to various styles of bicycles and bicycle parts.

The term "comprising" and its derivatives, as used herein, are intended to be open ended terms that specify the presence of the stated features, elements, components, groups, integers, and/or steps. This concept also applies to words of similar meaning, for example, the terms "have," "include," and their derivatives.

The term "bicycle" and its derivatives, as used herein, are intended to be open ended terms that specify any vehicle or machine with a wheel that is propelled by the action of a cyclist's feet upon pedals, and encompasses outdoor bicycles, stationary bicycles, exercise cycles, indoor bicycles, and the like.

The terms of degree such as "approximately" as used herein mean a reasonable amount of deviation of the modified term such that the end result is not significantly changed (e.g., manufacturing tolerances).

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A control device for controlling a bicycle component in accordance with a seat position of a bicycle seat, the control device comprising:
   a transmitter configured to transmit a signal relating to the seat position of the bicycle seat;

a mounting structure configured to detachably mount the transmitter to at least one of a bicycle seat post, a seat tube, and the bicycle seat;

an operating member that moves in accordance with a telescopic movement of the bicycle seat post; and an operated member that is movable relative to the operating member, the operated member being operated by the operating member when the seat position is at a predetermined position to cause the transmitter to transmit the signal.

2. The control device according to claim 1, wherein a relative position of the operated member and the operating member is adjustable so that the predetermined position is adjustable.

3. The control device according to claim 2, wherein a position of the operated member is adjustable with respect to the transmitter in a direction of the telescopic movement of the bicycle seat post.

4. The control device according to claim 1, further comprising a plurality of the operated members disposed at respective positions that are different from each other along a direction of the telescopic movement of the bicycle seat post.

5. The control device according to claim 4, wherein at least one of the plurality of operated members is configured to be detachably attached to the control device.

6. The control device according to claim 1, wherein the operated member is a switch configured to be contacted by the operating member to cause the transmitter to transmit the signal.

7. The control device according to claim 6, wherein the operating member is a rod extending along a direction of the telescopic movement of the bicycle seat post.

8. The control device according to claim 1, further comprising an adjusting structure configured to adjust a relative position of the operated member and the operating member in a circumferential direction around the bicycle seat post.

9. The control device according to claim 1, wherein
the operated member is a sensor configured to detect the seat position of the bicycle seat; and
the transmitter includes a controller configured to control the transmitter such that the transmitter transmits the signal in response to a seat position signal detected by the sensor.

10. A control device for controlling a bicycle component in accordance with a seat position of a bicycle seat, the control device comprising:

a transmitter configured to transmit a signal relating to the seat position of the bicycle seat; and a mounting structure configured to detachably mount the transmitter to at least one of a bicycle seat post, a seat tube, and the bicycle seat, wherein the mounting structure includes:

a first mounting part configured to be mounted to one of the seat tube and a first cylinder of the bicycle seat post; and a second mounting part configured to be mounted to one of the bicycle seat and a second cylinder of the bicycle seat post, the second cylinder being configured to be attached to the bicycle seat.

11. The control device according to claim 10, wherein the first mounting part comprises a first clamping member configured to be detachably clamped to the one of the seat tube and the first cylinder of the bicycle seat post.

12. The control device according to claim 10, wherein the second mounting part comprises a second clamping member configured to be detachably clamped to the one of the bicycle seat and the second cylinder of the bicycle seat post.

13. A method of controlling a bicycle component in accordance with a seat position of a bicycle seat, the method comprising:

detachably mounting a transmitter to at least one of a bicycle seat post, a seat tube, and the bicycle seat;

transmitting, via the transmitter, a signal relating to the seat position of the bicycle seat; and operating an operating member that moves in accordance with a telescopic movement of the bicycle seat post, wherein an operated member that is movable relative to the operating member is operated by the operating member when the seat position is at a predetermined position to cause the transmitter to transmit the signal.

14. The method of claim 13, wherein a plurality of the operated members are disposed at respective positions that are different from each other along a direction of the telescopic movement of the bicycle seat post.

15. The method of claim 13, wherein the operated member is a switch, the method further comprising contacting the switch by the operating member to transmit the signal.

16. The method of claim 15, wherein the operating member is a rod extending along a direction of the telescopic movement of the bicycle seat post.

* * * * *